United States Patent [19]

Krol

[11] 3,969,975
[45] July 20, 1976

[54] HEAVY DUTY STAPLE

[75] Inventor: Harry J. Krol, Arlington Heights, Ill.

[73] Assignee: King-Koral, Inc., Glenview, Ill.

[22] Filed: Apr. 28, 1975

[21] Appl. No.: 572,207

[52] U.S. Cl. .......................................... 85/49; 85/21
[51] Int. Cl.² .......................................... F16B 15/06
[58] Field of Search ................ 85/49, 21, 22, 30, 31

[56] References Cited
UNITED STATES PATENTS

| | | | |
|---|---|---|---|
| 364,779 | 6/1887 | Seymour | 85/22 |
| 692,763 | 2/1902 | Bracey | 85/30 |
| 1,478,932 | 12/1923 | Wetz et al. | 85/49 |
| 2,678,484 | 5/1954 | Brown | 85/21 X |
| 2,867,807 | 1/1959 | Anstett | 85/49 X |

Primary Examiner—Ramon S. Britts
Attorney, Agent, or Firm—Hill, Gross, Simpson, Van Santen, Steadman, Chiara & Simpson

[57] ABSTRACT

A heavy duty staple especially suitable for heavy duty outdoor uses such as in securing ground wires to wooden utility poles, and made from material of generally square cross section having along corners of the staple prongs longitudinal series of coined V-shaped interlock notches defined by substantially triangularly arrow-shaped surfaces with their apecis at the prong corners. Resistance to withdrawal of the staple from a wooden member into which driven is increased by lateral bulging projection of material coined from the notches.

15 Claims, 6 Drawing Figures

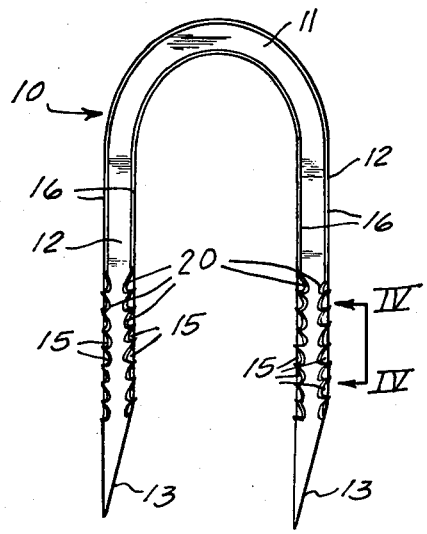
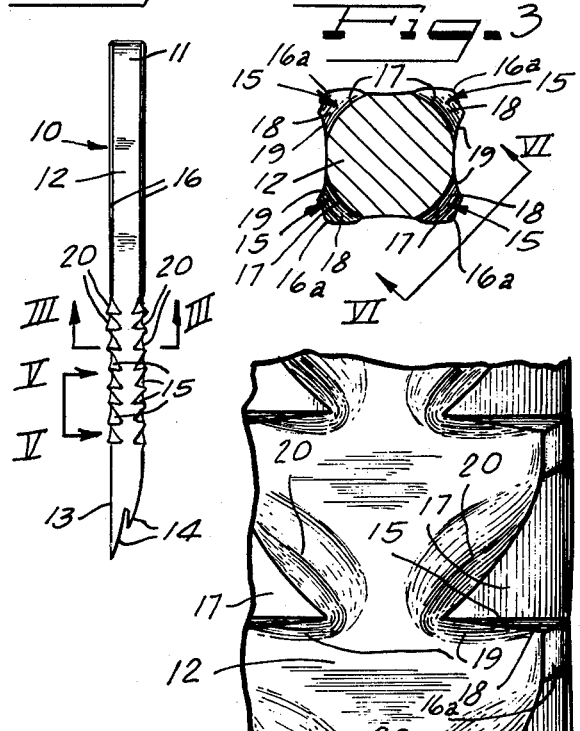
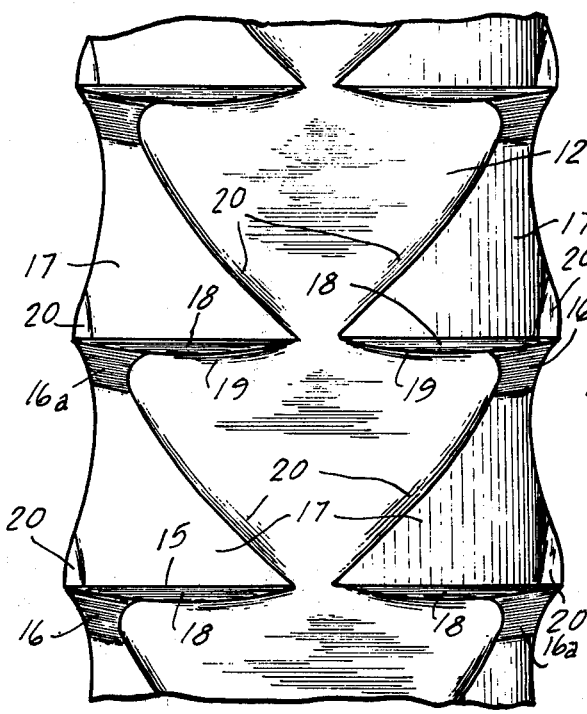
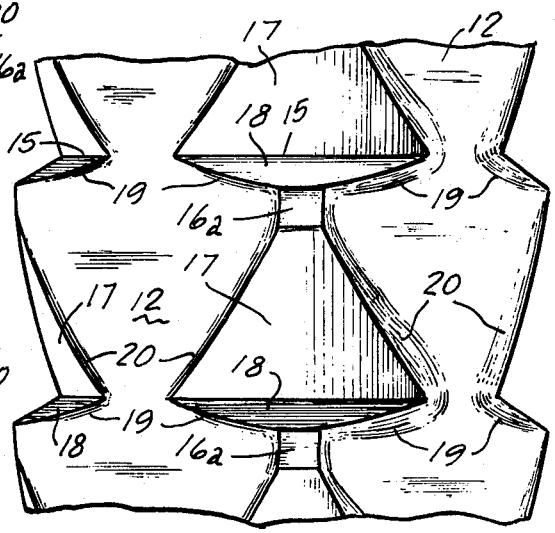

HEAVY DUTY STAPLE

This invention relates to heavy duty staples such as may be especially useful in the electrical utilities industries, for example to secure ground wires and other members to wooden utility poles.

Staples as heretofore provided have had various and sundry disadvantages, deficiencies, shortcomings and have presented various problems both structurally and economically. Some staples have barbs of such roughness as to unduly tear the wood during driving so that the wood cannot properly recover and grip the staple whereby poor holding power results, and weathering can creep into the wood along the staple prongs to accelerate deterioration. Where the staple prongs or legs are inadequately anchored, they will not resist pulling out sufficiently to withstand abuse such as severe weathering conditions, brushing thereagainst of objects such as lawn mowers, linemen's boots, animals rubbing thereagainst, vibrations, bending stresses, etc. Round wire types of staples have had as one shortcoming the single point contact on the head for driving hammer impact so that there is undue concentration at such point and thus the liability of flattening until enough flat results to secure full power of blows to drive the staple into denser types or denser areas of wood. This may result in undesirable bending distortions of the head.

Prior structures have often been difficult to make, or at least require slow manufacturing techniques, such, for example as round wire staples with rolled barbs in the production of which the wire must first be cut to length, then points formed on the legs, after which roll forming of the barbs is effected by rolling entirely around the perimeter of the wire, and the piece then finally formed into a staple. Production thus depends on how fast the roll forming tools can advance and return to the original position to pick up the next blank.

It is therefore an important object of the present invention to overcome the foregoing and other disadvantages, deficiencies, inefficiencies, shortcomings and problems in respect to staples of the type indicated and to attain important improvements and advantages and new and improved results in the structure of such staples.

Another object of the invention is to provide a new and improved heavy duty staple especially useful for securing members to heavy timbers such as utility poles.

A further object of the invention is to provide a new and improved heavy duty staple which is relatively easy to drive into wood and which maintains an unusually secure anchorage in the wood.

Still another object of the invention is to provide a new and improved anchoring shoulder structure on staple prongs affording improved strength and resistance to undesirable bending or deflection during driving and with improved holding coaction in the wood into which driven.

A yet further object of the invention is to provide a new and improved staple having novel retaining structure along corners of generally square cross section legs or prongs, offering minimum resistance to driving into wood but providing strong resistance to withdrawal from the wood.

Other objects, features and advantages of the invention will be readily apparent from the following description of certain preferred embodiments thereof, taken in conjunction with the accompanying drawing although variations and modifications may be effected without departing from the spirit and scope of the novel concepts embodied in the disclosure, and in which:

FIG. 1 is a face elevational view of a staple embodying features of the invention;

FIG. 2 is a side elevational view of the staple;

FIG. 3 is an enlarged sectional detail view through one of the prongs of the staple, taken substantially along the line III—III of FIG. 2;

FIG. 4 is a greatly enlarged fragmentary side elevational view of the notched length of one of the prongs, taken as indicated by the line IV—IV of FIG. 1;

FIG. 5 is a similar view taken as indicated by the line V—V of FIG. 2; and

FIG. 6 is a fragmentary enlarged elevational view of one notched corner length of one of the legs taken as indicated by the line VI—VI of FIG. 3.

A heavy duty staple 10 (FIGS. 1 and 2) embodying features of the invention is especially constructed and adapted for use in securing a ground wire, which may be protectively enclosed in a ground wire cover, to a wooden utility pole. The staple 10 is made from generally square cross section suitable grade steel wire or rod stock of suitable dimensions such as on the order of 7/32 inch cross section with an overall length of about 3½ inch and width of about 1½ inch. The staple 10 has a U-shape including an arcuate crown 11 integrally connecting substantially coextensive legs or prongs 12 terminating in sharp penetrating tips 13 which may be of generally spade edge shape as shown and for improved driving facility provided with dual sharp points 14. In the use of the staple 10 it is applied point first to the surface into which to be driven and a tool, such as a hammer, applied against the crown 11. It will be observed the the square cross section provides a transversely flat area of about the full width of the cross section on top of the crown to receive the impact of the driving tool.

By reason of the rather bulky cross sectional mass of the staple shanks or prongs 12, they must compress and displace a corresponding mass of wood fibers of the member into which driven. The wood fibers, and especially the growth rings therein are substantially resistant to displacement and strongly react toward the driven-in prongs. This characteristic of the wood is utilized to advantage according to the present invention by providing the prongs 12 of the staple 10 with new and improved anchoring means coactive with the wood for strongly resisting withdrawal of the prongs. To this end, each of the prongs 12 is provided throughout a substantial length adjacent to the tips 13 with longitudinal series of transverse anchoring notches 15 along each of the prongs 12. Excellent results are obtained where the notches 15 are formed only in and along narrowly chamfered corners 16 of the square cross section prongs 12, preferably leaving substantial longitudinal areas of each of the four faces of each of the prongs intact. In a staple of the general dimensions indicated there may be a series of about eight of the notches 15 in and along each of the corners 16 of the prongs starting at the proximal ends of the tapered tips 13.

In a preferred construction, the notches 15 are substantially the same in each series and their structure is such that they can be economically made by coining whereby the material displaced from the notches is utilized in connection with the notches for additional anchorage in the wooden member into which the staple is driven. To this end, each of the anchoring notches 15 is pressed, i.e. coined to provide a generally V-shaped recess in the associated corner 16, defined by an inwardly slanting surface 17 which starts at the corner and extends slantingly inwardly generally toward the associated tip 13 to meet the inner end of a ledge-like shoulder surface 18 which faces generally toward the head end of the staple but may slope slightly from convergence with the surface 17. Both the surface 17 and the shoulder 18 are of substantially triangular arrow-shape with their apices at the prong corners. Thereby the shoulder 18 provides, in effect, a barb interlockingly engageable with wood fibers, including the denser growth rings, which expand into the notches after the tips of the barbs have passed by the fibers displaced by the mass of the driven-in staple. Such passage is facilitated with minimal damage to the fibers by the slanting cam surface 17 within each of the notches leading to blunt barb tips 16a provided by the short lengths of the edges 16 remaining between contiguous notches. Camming of the wood fibers by the slanting surfaces 17 during staple driving is facilitated by compound convex contour of these surfaces which are of not only transversely convex shape (FIG. 3) but also of longitudinally convex shape (FIGS. 4, 5 and 6). It may also be pointed out that the transversely convex shape of the surfaces 17, and more particularly at a convex convergence juncture line of such surfaces with the shoulders 18 extending from side-to-side of the notches, minimizes weakening of the shanks of the prongs 12 even though the notches 15 are formed in transverse alignment in each of the successive tiers of the notches in each of the prongs.

Contributing to the driving and holding efficiency of the staple 10 is the structure provided by the material displaced from the notches in coining the same. To this end, coining-displaced material provides at the sides of the shoulders 18 laterally bulging shoulder extensions 19 which effectively extend and increase the interlocking shoulder area, even though the notches 15 are coined only to a limited depth wherein the sides of notches are substantially spaced from the adjacent notches in each tier, thereby leaving substantial free continuous areas of the respective longitudinal face surfaces of the prongs 12 between the deepest portions of the notches. In addition, displaced material along the sides of the slanting surfaces 17 provides longitudinally elongated shoulder bulges 20 facing generally toward the head end of the staple and thereby providing retaining shoulders supplemental to the shoulders 18 in effecting interlock with wood expanding and crowding thereagainst after the staple has been driven. As will be particularly apparent from FIGS. 4 and 5, the shoulder bulges 20 by their convergence toward one another in effect provide pockets along the face surfaces of the prongs 12 within which expanded and crowded-in wood effectively grips and interlocks with the staple prongs to assist the shoulders 18 in maintaining an efficient interlocked relationship within the wood.

By reason of the shoulder bulges 19 and 20 having rounded off contours, especially at their surfaces facing generally toward the tips 13 of the staple prongs, damage to the wood fibers during driving of the staple is minimized, which contributes significantly to resistance to weathering and thus to prolonged holding efficiency of the staple.

The square cross section of the prongs 12 provides an advantageous efficient coining pressure vector relationship attaining maximum yield for power input into the corners along the prongs.

It will be understood that variations and modifications may be effected without departing from the spirit and scope of the novel concepts of this invention.

I claim as my invention:

1. A staple having a head end and elongated spaced substantially coextensive prongs with pointed tips, the prongs being of generally square cross section each provided with four longitudinal corners:

a plurality of the corners on each of the prongs having respective series of longitudinally spaced interlock notches;

each of said notches being defined by a shoulder facing generally toward the head end of the staple and a surface slanting from the inner end of the shoulder and running out at the associated prong corner, the shoulders on said four corners being arranged so as to be in sets with each set disposed in a common plane extended transversely of a longitudinal axis through the associated prong and with the sets being arranged in a series of generally parallel planes extending along the length of the prong enabling each set of shoulders to be simultaneously embedded when the staple is driven into an object and with the shoulders and the associated notches in each set being spaced from one another about a central axis of the associated prong;

said notches being coined, and with material displaced from the notches providing lateral shoulder bulges on the faces of the prongs alongside the notches thus increasing the effective areas of the shoulders.

2. A staple according to claim 1, in which material displaced from the notches provides shoulder bulges along the sides of the slanting surfaces facing generally toward the head end of the staple to serve supplemental to the notch shoulders for interlocking with wood into which the staple may be driven.

3. A staple according to claim 1, in which said slanting surfaces are both transversely and longitudinally convex and the convergence of said slanting surfaces and said shoulders is on a convex line from side to side of the notches.

4. A staple according to claim 1, wherein said shoulders slope toward the distal ends of the prongs.

5. A staple according to claim 1, wherein said corners are narrowly chamfered, and residual portions of the corners between longitudinally adjacent ones of the notches provide blunt tips at outer barb ends of the shoulders.

6. A staple according to claim 1, wherein said notches are provided in all four corners of each of the prongs in a plurality of transversely aligned tiers and with substantial longitudinal areas of all of the faces of each of the prongs intervening between the notches in the tiers.

7. A staple according to claim 1, wherein the prongs terminate in generally spade-form sharp tips, said tips being subdivided into a plurality of points.

8. A staple according to claim 1, wherein adjacent of the corners are provided with said notches, material displaced from the notches providing shoulder bulges at the faces of the prongs alongside said slanting surfaces and said shoulder bulges converging toward one another and defining interlock pockets for receiving wood expanding thereinto when the staple is driven into a wood member.

9. A staple according to claim 1, having lateral shoulder bulges of material displaced from the notches along sides of said shoulders and slanting surfaces joining at the ends of the juncture of the slanting surfaces and shoulders at each side of each of the notches.

10. A staple according to claim 1, wherein each of the four corners of each of the prongs has said notches coined therein and disposed in tiers in which the side of the notches in the tiers extend short of one another so that there is a substantial unaltered longitudinal area of each face of each of the prongs intervening between the sides of the series of notches, said corners being narrowly chamfered to blunt the edges presented by the corners, residual portions of the corners between longitudinally contiguous notches providing blunt barb tips at the outer ends of said shoulders, the sides of said shoulders converging toward the blunt tips, said slanting surfaces of the notches being convex both transversely and longitudinally, lateral bulges on the prong faces alongside each of said shoulders providing additional effective interlock surface area for each of the shoulders, and lateral bulges on said faces alongside the slanting surfaces providing auxiliary interlock shoulders facing generally toward the head end of the staple, said bulges being of substantially smoothly rounded form at least on their surfaces facing generally toward the distal ends of said prongs.

11. A staple according to claim 10, wherein said auxiliary shoulder bulges alongside the slanting surfaces extend throughout substantial length, and the auxiliary shoulders of contiguous series of the notches at the respective prong faces converge toward one another and define pockets receptive of wood expanding thereinto when the staple is driven into a wooden member.

12. A staple having a head end and elongated spaced substantially coextensive prongs with pointed tips, the prongs being of generally square cross section each provided with four longitudinal corners:

a plurality of the corners on each of the prongs having respective series of longitudinally spaced interlock notches;

each of said notches being defined by a shoulder facing generally toward the head end of the staple and a surface slanting from the inner end of the shoulder and running out at the associated prong corner, the shoulders on said four corners being arranged so as to be in sets with each set disposed in a common plane extended transversely of a longitudinal axis through the associated prong and with the sets being arranged in a series of generally parallel planes extending along the length of the prong enabling each set of shoulders to be simultaneously embedded when the staple is driven into an object and with the shoulders and the associated notches in each set being spaced from one another about a central axis of the associated prong.

13. A staple according to claim 12, wherein each of said notches being defined by a shoulder facing generally toward the head end of the staple and a surface slanting from the inner end of the shoulder and running out at the associated prong corner; and said slanting surface and said shoulder of each of said notches being substantially triangularly arrow-shaped with their apices at the prong corners, said notches are coined into said corners, and with material displaced from the notches providing lateral shoulder bulges at the sides of said shoulders.

14. A staple according to claim 12, wherein each of said notches including coined shoulders in said corners and with material displaced from the notches providing lateral shoulder bulges along the sides of said slanting surfaces.

15. A staple according to claim 12, wherein said notches are coined in said corners and with material displaced from the notches providing lateral shoulder bulges along the sides of said shoulders, other material displaced from said notches providing lateral shoulder bulges along the sides of said shoulders, and other material displaced from said notches providing shoulders along the sides of said slanting surfaces.

* * * * *